(12) United States Patent
Desin

(10) Patent No.: US 6,982,291 B2
(45) Date of Patent: Jan. 3, 2006

(54) MATERIAL CONDITIONER AND STABILIZER AND METHOD FOR MAKING AND USING SAME

(75) Inventor: Andrew Desin, Billings, MT (US)

(73) Assignee: Desin, LP, Billings, MT (US)

( * ) Notice: Subject to any disclaimer, the term of this patent is extended or adjusted under 35 U.S.C. 154(b) by 72 days.

(21) Appl. No.: 10/615,696

(22) Filed: Jul. 9, 2003

(65) Prior Publication Data

US 2005/0009962 A1    Jan. 13, 2005

(51) Int. Cl.
*C08L 95/00*    (2006.01)

(52) U.S. Cl. .......................................... 524/60; 524/61
(58) Field of Classification Search ..............................
524/60–61, 522–524, 575
See application file for complete search history.

(56) References Cited

U.S. PATENT DOCUMENTS

| | | | | |
|---|---|---|---|---|
| 3,592,788 A | * | 7/1971 | Rostler | 523/132 |
| 3,651,000 A | * | 3/1972 | Woodruff | 524/61 |
| 4,268,428 A | * | 5/1981 | Green | 524/71 |
| 4,812,493 A | * | 3/1989 | Cummings | 523/412 |
| 4,818,367 A | | 4/1989 | Winkler | 208/23 |
| 4,997,868 A | * | 3/1991 | Blanpain et al. | 524/59 |
| 5,151,456 A | * | 9/1992 | Elias et al. | 524/60 |
| 5,330,795 A | * | 7/1994 | Batdorf et al. | 427/393.6 |
| 5,670,567 A | | 9/1997 | Lahalih | 524/404 |
| 5,795,929 A | * | 8/1998 | Grubba | 524/60 |
| 5,824,725 A | | 10/1998 | Lahalih | 524/404 |
| 5,846,601 A | | 12/1998 | Ritter et al. | 427/221 |
| 2002/0058734 A1 | * | 5/2002 | Harlan | 524/59 |

* cited by examiner

*Primary Examiner*—Peter Szekely
(74) *Attorney, Agent, or Firm*—Reed Smith LLP

(57) ABSTRACT

A chemical composition and method for enhancing the physical properties of a materials. The composition may be used as a material conditioner and stabilizer is disclosed. The chemical composition may include a resin, a polymer, an emulsifier and an asphalt emulsion. The method of treating the material may include the steps of applying a chemical composition comprising a vinyl acrylic polymer, a styrene-butadiene copolymer, an anionic emulsifier and an asphalt emulsion. The materials treated may include soil.

7 Claims, 1 Drawing Sheet

MATERIAL CONDITIONER AND STABILIZER AND METHOD FOR MAKING AND USING SAME

BACKGROUND OF THE INVENTION

1. Field of the Invention

The present invention is directed generally to a composition and method for providing increased particle cohesiveness and durability and, more particularly, to a material conditioner and stabilizer and method thereof.

2. Description of the Background

In the United States alone, there are more than 1.5 million miles of unpaved roads and streets compared to just over 3.9 million miles of paved roadways. Unpaved mileage can include graded and drained roadways made of natural earth, gravel, stone, slag, shell or similar materials. These roadways are often aligned and graded to permit use by motor vehicles. In addition, there are thousands of miles of unpaved areas such as construction sites, parks, parking lots, racing tracks and mines.

Two of the most prevalent problems associated with unpaved roads are: (i) controlling traffic generated dust; and (ii) maintaining stability and strength of roads throughout the year.

Traffic generated dust from unpaved roads contributes significantly to airborne particles which degrade agricultural produce, cause respiratory problems, increase wear and tear on vehicles, and result in a higher rate of deterioration of the roadway. Reducing dust improves drivers' sight distance, reduces effects on adjacent roadside stream habitats, decreases the number of motor grater bladings needed to improve ride quality, and decrease the loss of surface aggregate.

The strength of unpaved roads undergoes significant fluctuations during the year due to the continuous variations in soil conditions. Stability and load-bearing capacity of unpaved roads depends mainly on shear strength of soil that, in turn, depends on the soil type. For example, under wet conditions, sand has an adequate cohesion due to the capillary stress, by which it has a sufficient load-bearing capacity. Under dry weather conditions, however, sand particles lose cohesion and separate, and the load-bearing capacity can be reduced to almost zero. Clay, on the other hand, develops considerable cohesion in dry conditions, and has a high load-bearing capacity, which however, rapidly decreases with increased moisture content. Adverse climate and loading conditions, such as freeze-thaw variations and alternating dry-out shrinkage and wetting/swelling, can result in the formation of waves, transverse corrugations, rutting, and shoving. These types of formations are often referred to as wash-boarding for their distinctive appearance.

The various native soils encountered in road building and other load bearing applications often lack the mechanical properties required for satisfactory results. Inadequate soil strength can also lead to defects in the road surface, such as rutting, corrugation, cracking and failure of pavement and gross shifts in the load surface. Poor water absorption properties of clay soils can lead to heaving, surface failure, seasonal shifts, extrusion of base material and other problems.

Soils too weak to bear the anticipated load can be stabilized by the addition of materials which impart mechanical strength, such as aggregate, and by the addition of chemical stabilizers, which decrease water absorption and increase the cohesion of the soil matrix by forming a cement-like compound to hold the matrix together. The appropriate type of stabilization and results to be expected depend upon the soil types encountered and methods of application of the stabilizer and construction of the road. A range of soil compositions can serve as good road base material, but high strength, resistance to shear and resistance to erosion or swelling by water are required. Most native soils require some extent of stabilization to achieve the goals and provide a proper material for road construction.

Several compounds have been used to stabilize soils, especially those intended to be a road surface, including calcium chloride and petroleum resins. Calcium chloride is a naturally occurring brine used for dust control and soil stabilization. The compound is hygroscopic, exhibiting a string moisture film, high surface tension, and low vapor pressure assisting in the binding of aggregate particles. A major limitation of this compound is its narrow application range. If the calcium chloride solution is applied at a less than specific dilution ratio, the effectiveness of the compound is diminished, while application at a higher than necessitated dilution ratio causes beading on the application surface and thus prevents treatment of the target soil.

Petroleum resins generally consist of a concentrated, non-volatile emulsion consisting of about 60% semi-liquid natural petroleum resins and 40% wetting solution. Although these products are effective dust retardants, overall soil stabilization is poor given the limited penetration of the resins into the soil profile. Petroleum resins may also be less environmentally friendly making their use prohibited in certain situations.

Therefore, the need exists for an environmentally friendly, water soluble chemical composition that can be used as a material conditioner and stabilizer.

BRIEF SUMMARY OF THE INVENTION

The present invention is directed to an environmentally friendly, water soluble chemical composition used as a compound material conditioner and stabilizer that is generally comprised of a resin, a polymer, and an emulsifier. The composition provides a treated material with improved properties, including pliantcy, durability, and imperviousness.

The present invention also includes a method of enhancing and conditioning the physical properties of a base material, such as soil, for example, by treating the material with a non-toxic, water soluble chemical composition composed of a resin, a polymer and an emulsifier, such as, for example, a vinyl acrylic polymer, a styrene-butadiene copolymer and an anionic emulsifier.

The present invention solves problems heretofore experienced with the prior art because it provides an economical, environmentally friendly chemical composition that can be used as a material conditioner and stabilizer. Those and other advantages and benefits of the present invention Will become apparent from the detailed description of the invention hereinbelow.

BRIEF DESCRIPTION OF THE SEVERAL VIEWS OF THE DRAWING

Understanding of the present invention will be facilitated by consideration of the following detailed description of the preferred embodiments of the present invention taken in conjunction with the accompanying drawing, in which like numerals refer to like parts, and wherein.

DETAILED DESCRIPTION OF THE INVENTION

Figure 1:
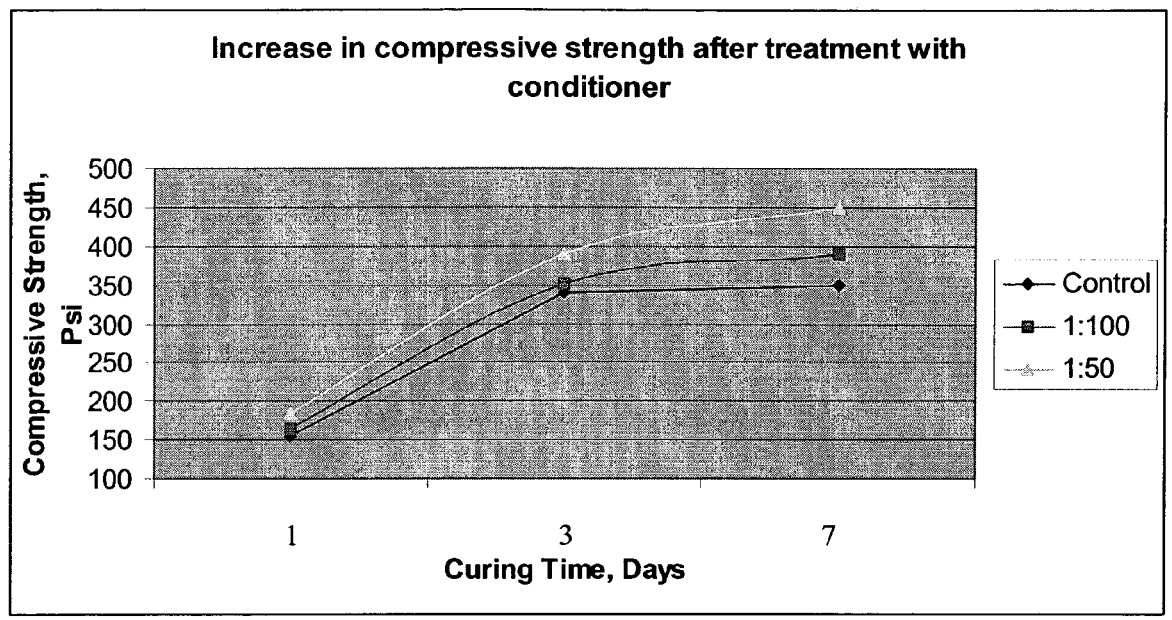
FIG. 1 is a graph illustrating the compressive strength of treated and untreated materials.

It is to be understood that the figures and descriptions of the present invention have been simplified to illustrate elements that are relevant for a clear understanding of the present invention, while eliminating, for purposes of clarity, many other elements found in typical material conditioners and stabilizers. Those of ordinary skill in the art will recognize that other elements may be desirable and/or required in order to implement the present invention. However, because such elements are well known in the art, and because they do not facilitate a better understanding of the present invention, a discussion of such elements may not be provided herein.

The invention provides for an increased penetration potential between material particles on their surface and inside the material particle through absorption, referred to as locking the bond, to form a rigid reinforcing network for a compacted material structure. This increase in the cohesive strength between particles also provides for water shedding on the material surface.

The compound of the present invention comprises a non-toxic, water soluble chemical composition used as a material conditioner and stabilizer. The compound generally comprises a resin and a polymer to which an emulsifier may also, optionally, be added. When the present invention is applied to a material, such as soil, for example, the loose soil particles or compacted surface appears to soften. This effect is caused by a fast diffusion potential induced by the lowering of the interfacial free energy, or surface tension, between the soil and the material conditioner and stabilizer. The resulting combination of the soil and the material conditioner and stabilizer resembles a saturated, bound sponge. The compound will begin to dry and plate out when an equilibrium compound film thickness between the surface particles is achieved. The penetration of the compound into the surface particles and subsequent establishment of the film thickness "drying switch" is surface particle or soil dependent, and can occur between about 10 to about 20 minutes after equilibrium is achieved. This gives the surface or soil particles not only characteristics of increased adhesion and reduced moisture sensitivity, referred to as interfacial bonding, but also increased inner particle bonding. As a result of the increased inner particle bonding, the treated material will experience an increase in particle cohesion and thus have a reduced shrink-swell potential. The subsequent increase in adhesive and cohesive strength and decrease in moisture sensitivity promotes surface particle or true soil stabilization.

The material conditioner and stabilizer compound comprises a resin, a polymer, and an emulsifier. The composition, when applied to a target material does not become brittle upon curing, resulting in greater pliantcy of the treated material. The polymer and resin used in the present invention may comprise, but is not limited to, polychloroprene, butyl latex, styrene-butadiene copolymer, a polyacrylic polymer, a vinyl-acrylic or styrene-acrylic copolymer, vinyl acetate/ethylene copolymer, vinylidene chloride/polyvinyl chloride copolymer, vinylidene chloride/butadiene copolymer, vinylidene chloride/polyvinyl chloride/acrylic terpolymer, vinylidene chloride/butadiene/acrylic terpolymer, polyurethane or mixtures thereof. When combined with an emulsifier, the compound may consist of from between about 55 to about 75% weight of a resin, from about 20 to about 30% weight of a binder and from about 1 to about 15% weight of an emulsifier. In one embodiment, chemical components of the compound may consist of, but are not limited to, a vinyl acrylic polymer, a styrene-butadiene copolymer, and an anionic emulsifier.

The anionic emulsifier may, for example, be selected from the group of emulsifiers consisting of SS-1H, CSS-1, CSS-1H, SS-1, CQS, CQS-1H, CSS-1P, CSS-1, CSS-1H, CRS-1, CRS-2, CMS-2, and CMS-2H.

TABLE 1

Example of a composition of the present invention.

| Compound | % by weight |
| --- | --- |
| Vinyl Acrylic | 65.5 |
| Styrene Butadiene Copolymer | 28 |
| Anionic Emulsifier | 5 |
| Defoamer | 1.5 |

In the embodiment set forth in Table 1 above, the material conditioner and stabilizer may be utilized as a surface sealant. When this embodiment of the compound is used as a surface sealant, the compound should be applied to the target surface to a depth of about ¼ inch to about 1 inch. Several applications of the material conditioner and stabilizer may be necessary depending of the dilution ratio of the material conditioner and stabilizer, soil type, and application method. In another embodiment, the material conditioner and stabilizer may be used to improve an existing unpaved roadway by applying a sufficient amount of the disclosed material conditioner and stabilizer compound to penetrate from the surface to a depth of at least about 3 inches.

Analysis of soil treated with the present invention at a dilution ratio, in water, of 1 part compound to 50 parts water and 1 part compound to 100 parts water is shown below in Table 2 and are illustrated in FIG. 1. A control compound comprising only water is applied as a material conditioner and stabilizer which was utilized as a base line for measuring the effectiveness of the present invention.

TABLE 2

Compressive strength of treated and untreated soil using the compound of the invention
Compressive Strength, Psi

| (ASTM 2166) | Water Only | Dilution Ratio of the present invention | |
| --- | --- | --- | --- |
| Curing Time | Control | 1:100 | 1:50 |
| 1 Day | 153 | 167 | 180 |
| 3 Day | 336 | 352 | 386 |
| 7 Day | 351 | 390 | 450 |

The following Table 3 shows particular soil properties of the soil used in the analysis of Table 2.

TABLE 3

Soil analysis Post-Treatment (Silty Sand, Brown)

| Sieve Analysis (ASTM C136) | | Plasticity Index (ASTM AASHTO T89) | Specific Gravity (ASTM C128) | Moisture Density (ASTM D 1557) 135.5 lb/ft³ @ 7.0% |
|---|---|---|---|---|
| Sieve Size | % Passing | Non Plastic | 2.660 | Optimum Moisture |
| ⅜" | 100 | | | |
| #4 | 97 | | | |
| #8 | 81 | | | |
| #16 | 63 | | | |
| #30 | 48 | | | |
| #50 | 34 | | | |
| #100 | 23 | | | |
| #200 | 16 | | | |

The soil analysis were completed using ASTM laboratory standards as shown above.

In yet another embodiment of the invention, the compound of the invention comprises a resin, a polymer, and an emulsion described above may combine with an asphalt emulsion which may be further combined with a wetting agent. Such a compound may further be used to, for example, patch paved roads, provide certain materials with a thin overlay which may provide increased strength and durability, and provide water resistance and sediment control. Table 4 provides an example of a conditioner mix including an asphalt emulsion and a wetting agent. An effective mixture of the conditioner and asphalt emulsion contains between about 65 and about 75% by weight water and between about 20 and about 30% by weight a catatonic asphalt emulsion. All components of the invention may be mixed by mechanical agitation and standard temperature and pressure. It is important to note that if water is used as the wetting agent, local ground water may be not be suitable for use with the present invention due to impurities and contaminates.

TABLE 4

Example of an asphalt emulsified composition of the present invention.

| Compound | % by weight |
|---|---|
| Resin, Polymer and Emulsifier Mixture | 3 |
| Cationic Asphalt Emulsion | 25 |
| Wetting Agents | 72 |

Asphalt emulsions are divided into three categories: anionic, cationic and nonionic. In practice, the first two types are ordinarily used in roadway construction and maintenance, although it may be possible to use in particular circumstances, anionic and cationic classes refer to the electrical charges surrounding the asphalt particles. This identification system stems from one of the basic laws of electricity: like charges repel one another and unlike charges attract. Emulsions are further classified on the basis of how quickly the asphalt will coalesce, or otherwise revert to asphalt cement. The terms RS, MS, and SS have been adopted to simplify and standardize this classification. They are relative terms only and mean rapid-setting ("RS"), medium-setting ("MS"), and slow-setting ("SS"). The tendency to coalesce is closely related to the mixing or other agitation of an emulsion. An RS emulsion is less likely to mix with an aggregate, and an SS emulsion is more likely to mix with fine aggregate.

Asphalt emulsions are further subdivided by a series of numbers related to viscosity of the asphalt emulsion and hardness of the base asphalt cements. The letter "C" in front of the emulsion type denotes cationic. The absence of the "C" denotes anionic or nonionic. For example, RS-1 is anionic or nonionic and CRS-1 is cationic.

The American Society for Testing and Materials (ASTM) and the American Association of State Highway and Transportation Officials (AASHTO) have developed the following standard specifications for varying grades of asphalt emulsions which are set forth in Table 5.

TABLE 5

ASTM and AASHTO grades of asphalt emulsions

| Emulsified Asphalt | Cationic Emulsified Asphalt |
|---|---|
| RS-1 | CRS-1 |
| RS-2 | CRS-2 |
| MS-1 | — |
| MS-2 | CMS-2 |
| MS-2h | CMS-2h |
| HFMS-1 | — |
| HFMS-2 | — |
| HFMS-2h | — |
| HFMS-2s | — |
| SS-1 | CSS-1 |
| SS-1h | CSS-1h |

The "h" that follows certain grades means that a harder base asphalt is used. The "HF" preceding some of the MS grades indicates high-float, a measured by the Float Test (ASTM D 139 or AASHTO 50). High-float emulsions have a quality, imparted by the addition of certain chemicals, that permit a thicker asphalt film on the aggregate particles with minimum probability of drainage. All grades in this lengthy list of emulsions may be used in the present invention.

While recognized engineering standards specify soil strength and properties in base and sub-base materials, the depth of the base and sub-base is chosen by load expectations and experience with local freeze-thaw conditions. In general, for untreated aggregate bases, the Asphalt Institute recommends a base thickness of between 6 and 12 inches (150 and 300 mm). In this embodiment of the invention, the compound should be applied to the base material to a depth of about 4 inches in order to accommodate the maximum loads typically encountered on roadways, although other depths may also achieve suitable functionality.

If the stability of local soil is not adequate for supporting wheel loads, its properties can be improved using suitable stabilizing agents, such as the compound of the invention herein disclosed. Soil stabilizers coat each individual particle and use physical, physio-chemical, and/or chemical methods to alter soil properties. Soil stabilization may result in any one or more of the following changes to the soil: increase in stability, change in density, change in swelling, change in physical characteristics, change in chemical properties, retaining the desired minimum strength by waterproofing, lower aggregate replacement costs, lower grading costs, and increased traction. Soil stabilizers and conditioners of the present invention may provide substantial erosion control, which may include, but is not limited to, the prevention of wind and water erosion.

The present invention may also be utilized for sediment control and as a dust suppressant to reduce dust emissions from unpaved surfaces. Dust suppressants are designed to alter the roadway by lightly cementing the particles together, either by increasing the particles' weight so that they are less likely to move under traffic or wind, or by forming a surface that attracts and retains moisture. Generally, they are applied to the road surface in a water solution, which dries on the surface of the road and holds down the dust created by vehicles and wind. The effectiveness of the dust control generally depends on application rate, compound dilution ratio, frequency of applications of the solution to the target surface, interaction of the solution with the target surface material, climatic conditions, road geometry, and the type, number, and velocity of vehicles using the road.

The present invention can be utilized in a variety of applications including for use in water conservation. More specifically, the present invention can be used to treat irrigation channels to prevent absorption of water into the walls and floor of the channel. Preventing absorption not only conserves water but also provides increased stability of the channel by preventing erosion and washouts. Levees can also be treated in a similar manner, further protecting the levees from the added effects of wind erosion. Mining activities may also benefit from the present invention, particularly with the treatment of slag produced from the mining process and the roadways and parking areas associated with the mining operation. Slag, or entails, from mining operation are generally stored in liquefied ponds or above-ground mounds. The surfaces of slag ponds may be treated with the compound of the invention to prevent absorption into the soil of liquid slag and associated compounds, such as heavy metals and toxins. The surface of the slag itself stored in mounds may be treated to retard the effects of wind and water erosion. Slag treated with the compound of this invention, regardless of storage technique or lack thereof, is more useful in the reclamation process by providing the slag with more stable physical properties.

The present invention may also be used in conjunction with aircraft landing strips. Treatment of shoulder areas of existing landing strips prevents dust and foreign object damage incidents while further providing for the control of vegetative growth and the related attraction of wildlife, such as birds. Rural landing strips for small planes may also be created using the compound of the present invention for stabilizing, compacting and protecting from wind and water erosion the treated strip of soil or other substitute such as asphalt.

Landfills provide an additional treatment opportunity for the present compound of this invention. Landfills are historically susceptible to wind erosion, water erosion, and damage by vehicles and equipment used in the management and use of such facilities. The ever-evolving surface of the landfill may be treated by the compound to protect the landfill from wind and water erosion, while additionally providing stabilization of the treated layers as they are replaced additional soil and landfill materials. The exterior treatment may also provide a durable surface for vehicles and earth-moving equipment preventing ruts and the sinking of heavy equipment on the untreated semi-compacted surface of the landfill.

Another further aspect of the invention is its use in road construction. Road design is a complex matter, taking into account the materials available, contractor experience and available equipment, weather conditions, desired life cycle, expected loads, local specifications, and, of course, economic constraints and other variables. Thus, the treatment of in situ native soils provides a more cost effective and timely method of road construction. Historically, roads constructed over native soils that were not suitable for compaction after wetting were removed and replaced with imported quarried materials. These imported materials were compacted but provided no bonding between soil particles, therefore being susceptible to vibrations form traffic and/or intrusion from water allowing separation of the base materials causing damage to the road foundation and any surface sealer of pavement.

The present invention may further be used to treat and protect nature trails and bicycle paths, providing an environmentally friendly solution to the wearing of these types of routes. Treatment of these surfaces provide increased strength and resistance to erosion from travelers, while also protecting the route from wind and water erosion, potentially saving costly future repair The treated surface may also be then assessable to many types of vehicles, as well as persons with disabilities who may be traveling the landscape in an alternative means, such as, for example, a wheelchair, by providing a smooth and compact travel surface. Travelers on treated paths would further benefit from the reduction of dust particles and control of vegetative growth which creates a safer more passable route.

The compound of this invention may be applied to a base material, such as, for example, by spraying or mechanically mixing the compound of the invention into the material to be treated. Spraying of the material may be accomplished by using, for example, a water truck with appropriate spray apparatus to obtain an even distribution of the composition at the desired dilution ratio over the entire area of the material to be treated. Mechanical mixing of the compound with the base material may be accomplished by using, for example, a motorized grader blade with ripper attachments or by disc or tiller. Such homogeneous mixing can also be completed using a pugmill or CTB plant, for example, and returned to the site by any means as long as homogeneity is not disrupted.

Preferred application rates of the compound of this invention are listed in Table 6 below. Most native soils and road base materials will vary and may actually be a combination of the soil classes listed in the table. The amount of concentrate to a given volume generally should be maintained according to the application rate, and the amount of water used is generally a function of soil type and existing moisture content. These standard rates appear to produce favorable strength properties with most soil types. However, some modification may be necessary to ensure the compatibility of soil type, amount and dilution of the compound of the invention and the most suitable method of application.

TABLE 6

Application Rates of the compound for various soil types

| General Class of Soil | AASHO Designation | Gallons/yd³ | Liters/m³ | Gallons (Liters) For 1 Acre At: | |
|---|---|---|---|---|---|
| | | | | 4 in. Depth | 6 in. Depth |
| PI < 10 Low to non-plastic soils | A-1-a, A-1-b Stone Fragments, Gravel, and Sand | 0.42 | 2.10 | 231 (875) | 350 (1330) |
| "Poor Soils" | A3 Fine Sand | 0.12 | 0.61 | 66 (250) | 100 (379) |
| | A-2-4, A-2-5, Silty Sand, Gravel | 0.21–0.32 | 1.18–1.59 | 116–175 (438–660) | 175–262 (660–994) |
| | A-4, A-5, Silty soils | 0.06–0.09 | 0.31–0.46 | 33–50 (125–189) | 50–75 (189–284) |
| PI < 30 Medium plastic soils | A-2-6, A-2-7 Clayey Gravel, Sand, PI < 30 | 0.21 | 1.18 | 116 (438) | 175 (660) |
| "Fair Soils" | A-6, A-7-5, A-7-6, Clayey Soils, PI < 30 | 0.21–0.32 | 1.18–1.59 | 116–175 (438–660) | 175–262 (660–994) |
| PI > 30 High plastic soils | A-2-6, A-2-7 Clayey Gravel, Sand, PI > 30 | 0.32–0.42 | 1.61–2.10 | 125–231 (660–875) | 262–350 (994–1327) |
| "Good Soils" | A-6, A-7-5, A-7-6, Clayey soils PI > 30 | 0.42 | 2.10 | 231 (875) | 350 (1327) |

PI = Plasticity Index, 4 inches (approx.) = 102 mm, 6 inches (approx.) = 150 mm.

In general, approximately 0.42 gallon/yd³ (2.10 liters/m³) of the compound may be used for poor soils, approximately 0.32 gallons/yd³ (1.64 liters/m³) of the compound may be used for fair soils, and approximately 0.21 gallon/yd³ (1.18 liters/m³) of the compound may be used for good soils. The application of the compound of the invention as shown in Table 6 may vary depending on the changing soil conditions during a project. Generally, the application rates do not fall under about 2.10 gallon/yd³ (1.18 liters/m³) for soils of the type shown in Table 6.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. An emulsion containing an asphalt emulsion blended with a compound for enhancing the physical properties of a material having pliancy, durability, and imperviousness, said compound comprising:
   65.5% by weight a first polymer;
   28% by weight a second polymer;
   5% by weight an emulsifier; and
   1.5% by weight a defoamer;
   wherein said first polymer and said second polymer change at least one of said pliantcy, durability, and imperviousness of the material; and
   wherein said first polymer is a vinyl acrylic polymer and said second polymer is a styrene-butadiene copolymer and said emulsifier is anionic.

2. The compound of claim 1, wherein said asphalt emulsion is cationic.

3. The compound of claim 1, wherein said asphalt emulsion is anionic.

4. The compound of claim 1, wherein said asphalt emulsion comprises about 25% by weight of the conditioner.

5. A method of enhancing and conditioning the physical properties of a material comprising:
   applying to said material a compound comprising 65.5% by weight a first polymer, 28% by weight, a second polymer, 5% by weight an emulsifier, and 1.5% by weight defoamer;
   wherein said first polymer and said second polymer change at least one of said pliantcy, durability, and imperviousness of the material;
   wherein said first polymer is a vinyl acrylic polymer and said second polymer is a styrene-butadiene copolymer and said emulsifier is anionic; and
   wherein said compound is applied to soil at a rate of about 0.21 to about 0.42 gallons per cubic yard.

6. The method of claim 5 wherein the applying of said compound is applied by mechanical mixing.

7. The method of claim 5 wherein said compound is applied to said material at a depth of about 3 inches.

* * * * *